United States Patent
Chimenti

[19]

[11] Patent Number: 6,000,593
[45] Date of Patent: Dec. 14, 1999

[54] SHOCK ABSORBING CARRIER MOUNTABLE TO A VEHICLE FOR CARRYING SPORTS EQUIPMENT

[75] Inventor: Thomas A. Chimenti, Fairfield, Conn.

[73] Assignee: Industri AB Thule

[21] Appl. No.: 08/459,267

[22] Filed: Jun. 2, 1995

[51] Int. Cl.[6] .................................................. B60R 9/10
[52] U.S. Cl. .......................................... 224/504; 224/924
[58] Field of Search .................................. 224/924, 490, 224/504, 507, 509, 553

[56] References Cited

U.S. PATENT DOCUMENTS

| | | |
|---|---|---|
| 2,270,569 | 1/1942 | Weiss . |
| 2,321,535 | 6/1943 | Weiss . |
| 3,923,220 | 12/1975 | Marcyan . |
| 4,029,333 | 6/1977 | Christensen . |
| 4,403,716 | 9/1983 | Carlson et al. . |
| 4,997,116 | 3/1991 | Grim ......................................... 224/924 |
| 5,056,699 | 10/1991 | Newbold et al. . |
| 5,067,641 | 11/1991 | Johnson et al. . |
| 5,195,670 | 3/1993 | Piretti et al. . |
| 5,211,323 | 5/1993 | Chimenti et al. . |
| 5,244,133 | 9/1993 | Abbott et al. . |
| 5,259,542 | 11/1993 | Newbold et al. ....................... 224/924 |
| 5,344,175 | 9/1994 | Speer . |
| 5,363,996 | 11/1994 | Raaber et al. ...................... 224/507 X |
| 5,377,885 | 1/1995 | Wyers . |
| 5,421,495 | 6/1995 | Bubik et al. ............................. 224/924 |
| 5,460,304 | 10/1995 | Porter et al. ............................ 224/924 |

FOREIGN PATENT DOCUMENTS

| | | |
|---|---|---|
| 0476288 A1 | 8/1991 | European Pat. Off. . |
| 4028433 C1 | 9/1990 | Germany . |
| 4125529 C1 | 8/1991 | Germany . |

Primary Examiner—Renee S. Luebke
Attorney, Agent, or Firm—Royston, Rayzor, Vickery, Novak & Druce, L.L.P.

[57] ABSTRACT

Apparatus and method for providing a shock absorbing bicycle carrier engageable with a transporting vehicle is disclosed. The carrier includes an interconnecting frame to which mounting members are arranged for fixed orientation thereto and support arms are connected thereto for limited and controlled relative motion therebetween. A shock absorber is coupled within the carrier between the shock inducing carrying vehicle and the bicycle support arm. The shock absorber may be selectively chosen for variable resistive force or may be selectively variable by an operator. Among other embodiments, the shock absorber may take the form of an elastomeric shock, a coil spring shock, and/or a compressed fluid shock.

12 Claims, 12 Drawing Sheets

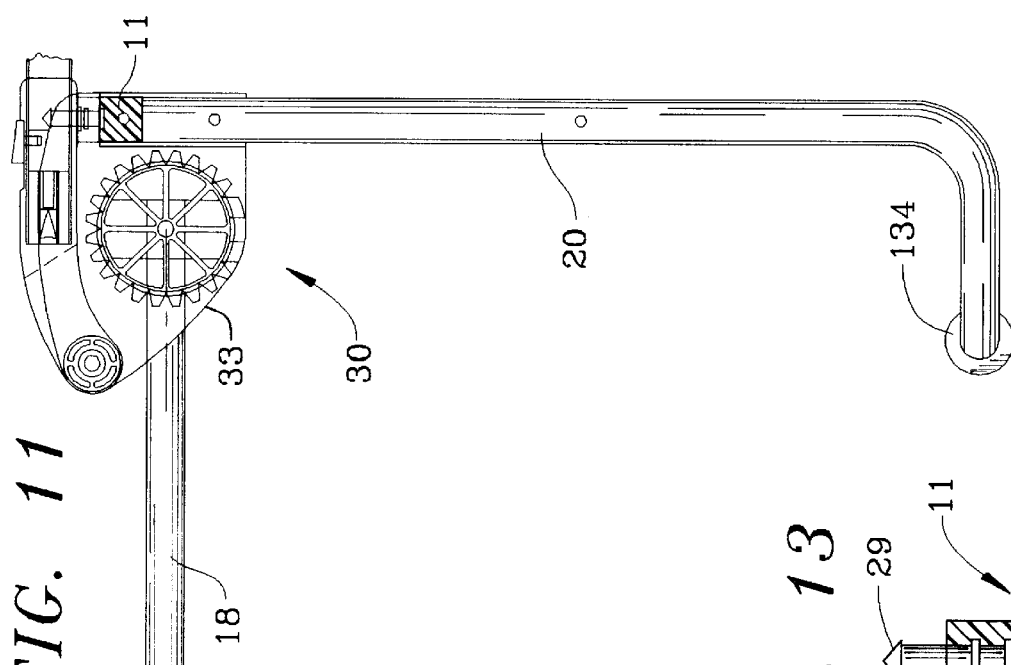
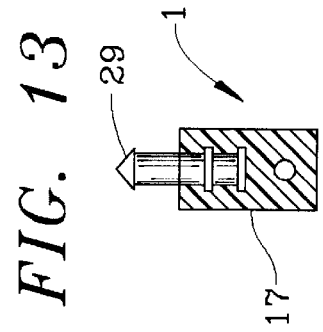
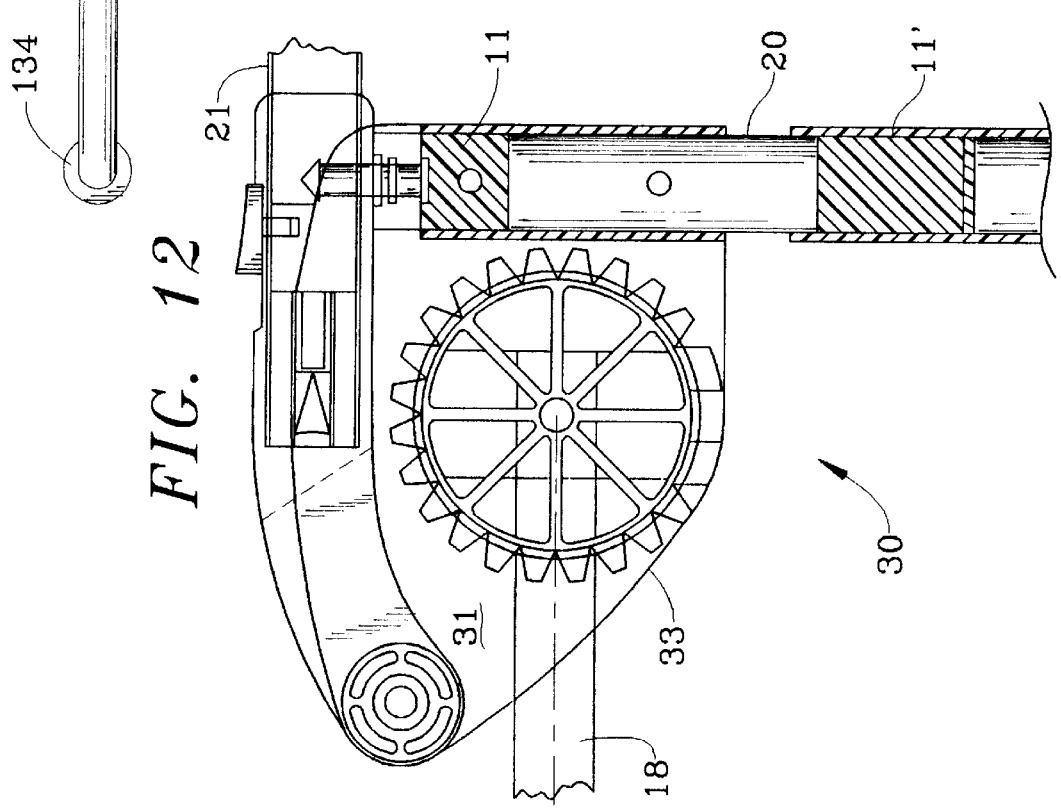

SHOCK ABSORBING CARRIER MOUNTABLE TO A VEHICLE FOR CARRYING SPORTS EQUIPMENT

FIELD OF THE INVENTION

The present invention relates generally to carriers mountable to vehicles for transporting sports equipment. More particularly, it relates to carriers mountable to a rear end of a vehicle for transporting bicycles.

BACKGROUND OF THE INVENTION

Many types of sports equipment are useable only under certain conditions and/or in specific locales. Examples of such sports equipment include surfboards that are ridden at beaches and snow skis that are normally used at ski resorts. The beach and ski areas are often remotely located from the homes of those who use them, therefore the need for transporting sports equipment upon vehicles to these locations has long been recognized.

In the instance of bicycling, a rider will often desire to ride his or her bicycle in different areas without having to ride the bicycle to those areas. To facilitate the transportation of one or more bicycles, bicycle carriers mountable to passenger vehicles have been developed. The carriers are typically mountable to the rear end of a vehicle, however, the carriers may be configured to be mounted at other locations upon a vehicle as long as the location is convenient for loading the bicycles onto the carriers and neither the bicycles nor the carrier inconveniences the driver or obstructs visibility. Examples of such bicycle carriers are disclosed in U.S. Pat. No. 5,211,323 to Chimenti et al for a BICYCLE CARRIER ADAPTED TO BE MOUNTED ON THE BACK OF A VEHICLE and U.S. Pat. No. 5,363,996 to Raaber et al also entitled BICYCLE CARRIER ADAPTED TO BE MOUNTED ON THE BACK OF A VEHICLE, each of which is commonly owned together with the present invention and whose disclosures are expressly incorporated herein.

The carriers of the above referenced patents are mountable to the rear end of a carrying passenger vehicle. The carriers incorporate rigid mounting members that engage surfaces of the vehicle and clippable straps that when tightened secure the carrier to the vehicle. The carrier further includes support arms that extend away from the vehicle and upon which one or more bicycles may be secured. Once the carrier is properly configured for the particular vehicle upon which it is to be installed and it is secured thereupon, the orientation of the mounting members and support arms is fixed so that relative movement therebetween is prevented.

It has been discovered that the rigidly fixed orientation within a bicycle carrier as described hereinabove results in undue and potentially damaging forces or loads being generated within the structure of the carrier under certain circumstances during use. In some cases, these forces may be detrimentally communicated to the bicycle or other equipment carried upon the support arms. More typically, however, detrimental forces will be experienced at the cantilever connection of the support arm to the carrier. As with all cantilevers, the reaction forces at the cantilever connection required to resist moments caused by forces applied upon the cantilever at locations distal to said connection are greater than those distally applied forces. The amplification is due to the leveraging effect of the distance between the connection and the point at which the force is applied.

The forces are generated in the carrier when the carrying vehicle moves rapidly in the vertical direction. These vertical movements typically result from the vehicle passing over irregularities in the roadway being traveled. Obvious irregularities would include speed bumps and "chuckholes", but any depression or rise in the roadway may result in the vehicle moving rapidly upward and/or downward depending upon the depth or height of the irregularity and the speed at which the vehicle is travelling. It has been found that forces induced within the carrier and imparted upon the equipment being carried may exceed several times that of gravity. While padding material has been provided between the carrier and the vehicle for protecting each from the other, the cushioning effect of the padding may not be sufficient to dampen the forces transferred therebetween.

SUMMARY OF THE INVENTION

In an effort to alleviate the detrimental effects of shock forces generated within sports equipment carriers, the benefits of including a shock absorbing mechanism in the structure of a carrier have been recognized by the applicant.

Therefore, the present invention provides a means for dissipating and minimizing shock forces generated within a sports equipment carrier by incorporating a force or shock absorber into the structure of the carrier. As explained above, the detrimental forces or loads result from sharp movements of the carrying vehicle in the vertical direction. The most damaging effects of the forces are experienced at the connection between the frame of the carrier and the support arms upon which the equipment or bicycles are secured. Therefore, inclusion of a force absorbing member in the carrier at any position between the vehicle and the support arm is contemplated to dampen the effects of the vehicle's sharp up and down movements. Since it is rapid or sharp movements of the vehicle that produce damaging "shock" forces or loads and accelerations within the carrier, and it is these effects that are most desired to be absorbed, the force absorber will be interchangeably referred to as a shock absorber herein.

The shock absorber may be advantageously coupled between the carrier frame and the support arm. To permit the shock absorber to operate, some degree of "play" must be permitted in the connection into which the shock absorber is coupled; that is, the components of the carrier on opposite sides of the shock absorber are not fixed relative to one another.

In the several embodiments of the present invention that are disclosed herein, it is contemplated that the carrier may be associated with a transporting vehicle in a number of ways. The carrier may be directly connected to the rear of the vehicle. Alternatively, the carrier may be coupled to the vehicle with one or more components interposed therebetween. As an example, the carrier may be secured to a hitch assembly that is in turn connected to the vehicle. In any event, when the present invention is described herein as being mounted to, secured to, or otherwise associated with a vehicle, it is to be understood that the association may be direct or indirect with intermediate components therebetween.

In one embodiment described and illustrated herein, the support arm is permitted to move generally rotationally through a limited range of travel with respect to the rest of the carrier that is fixedly mounted to a vehicle. The movement of the arm through the limited range of travel is controlled by the shock absorber. Alternatively, the shock absorber can be arranged in a brace member of the carrier and operate in a more linear fashion. During travel over level pavement, the shock absorber acts as a direct connection between the carrier frame and the support arm; that is, there is no relative movement between the arm and frame. When the vehicle encounters irregularities sufficient to produce damaging shock forces within the carrier, however, the shock absorber will yield by expanding and contracting to allow relative movement between the arm and the carrier frame. The absorber generates a variable resistive force that increases or decreases commensurately to oppose the applied force thereby cancelling and dissipating it. Instead of transferring the vertical forces and accelerations induced by the traveling vehicle to the support arm, they will be dissipated in the absorber and prevented from being communicated downstream of the absorber within the carrier structure.

The shock absorber must be resilient in operation. In the various configurations and embodiments of the present invention that are disclosed herein, the shock absorbing elements may act in either compression or tension, or a combination of both. In one embodiment, the shock absorber takes the form of a resilient elastomeric member, typically formed from rubber or a similar material, that may operate in compression, tension or both. By selecting elastomers of different durometers, the "stiffness" of the elastomeric shock may be varied. By varying the stiffness of the elastomer, the resistive capability of the absorber may be controlled.

Alternatively, the shock absorber may take the form of a coil spring that similarly operates as a buffer under both compression and tension. Like the elastomeric shock, the coil spring shock may be selectively variable by choosing springs of different resistive force. In still a further aspect, the shock absorber may include another adjustable absorbing element that is provided in series with the elastomeric element.

The ability to variably control the resistive force of a shock absorber, and therefore its damping capabilities, is beneficial within the application of the present invention. One exemplary embodiment includes a spring having excess resistive capacity that may be pre-loaded to accommodate variable bicycle weights. As another alternative, the shock absorber may take the form of a conventional "fluid shock" in which compressed fluid is captured between components capable of relative motion therebetween. The resistive force of these types of shock absorbers may be varied by varying the pressure of the buffering fluid retained within the fluid shock. Because it is contemplated that the shock absorbers of the present invention may be placed at any suitable location within the structure of the carrier, fluid shocks of conventional design may be linearly incorporated into the legs of the lower mounting member through which a majority of the force and acceleration is imparted to the carrier from the carrying vehicle.

Through the provision of these variable resistive shock absorbers, the carrier may be variably adjusted for different bicycle load weights, as well as variable travel conditions. The heavier the load, the stiffer the shock required. Similarly, the greater the shock effects expected to be experienced, the stiffer and more resistive the shock needed. A sufficiently stiff shock capable of resisting and absorbing the applied forces is required to prevent travel completely across the "play or slack" range of the buffered connection that would otherwise result in undesirable and "shocking" impact between the components to be buffered. In addition, the degree of play or the resistivity of the shock absorber may be altered if repeated significant shock impacts are anticipated e.g. for off-road applications. Obviously, the degree of play must be controlled to avoid dislodgement of the sports equipment from the carrier resulting from "bounce" induced by up and down motion of the carrying vehicle.

Regarding the present invention, several embodiments are contemplated. One embodiment of the carrier is for carrying different types of sports equipment. The carrier includes a pair of mutually rotatable mounting members for engagement with a vehicle. The carrier further includes at least one support arm for holding the sports equipment. The arm is vertically movable relative to at least one of the mounting members and is arranged in a use position. A force or shock absorber is operable between the support arm and at least one of the mounting members to assist in retaining the support arm in the use position and to absorb shock loads applied in a generally vertical direction to portions of the support arm.

In another embodiment, a shock absorbing bicycle carrier is provided for use with a vehicle. The carrier comprising includes a mounting member for engaging the carrier to a vehicle. A bicycle support arm is coupled to the mounting member for holding a bicycle upon the arm. A shock absorber is coupled to the carrier between the vehicle and the bicycle for dissipating shock loads generated within the carrier as a result of rapid movement of the vehicle in a generally vertical direction.

The bicycle support arm is oriented to a bicycle carrying configuration by the shock absorber when the support arm is loaded with the weight force of a bicycle carried thereupon. The shock absorber yields to allow controlled relative movement between the support arm and the vehicle when the support arm is loaded with generally vertical forces greater than the weight force.

In still another embodiment of the invention, a shock absorbing interconnector for a sports equipment carrier for use with a vehicle is disclosed. The interconnector includes an interconnecting frame, a mounting member connection for coupling a mounting member to the interconnecting frame; a support arm connection for coupling a sports equipment support arm to the interconnecting frame whereby a piece of sports equipment is supportable by the interconnector. A force absorber is coupled between the interconnecting frame and the support arm connection for dissipating shock loads generated between the support arm connection and the interconnecting frame as a result of movement in a generally vertical direction of the interconnector.

In yet another embodiment, the force absorber includes a biasing means that urges the support arm to an equipment carrying configuration when a vertical load upon the support arm is the weight of a piece of sports equipment supported thereon. The biasing means is resiliently yieldable when vertical loads greater than the weight of the piece of sports equipment are vertically experienced by the support arm.

Optionally, the force absorber includes an adjustable biasing means wherein the resistance force exertable by the biasing means is variable.

In a further embodiment, a shock absorbing bicycle carrier adapted to be mounted to the rear of a vehicle is provided. The carrier includes an interconnecting frame and at least one mounting member coupled to the interconnecting frame for mounting the bicycle carrier to a vehicle. A support arm is pivotally coupled to the interconnecting frame and a piece of sports equipment may be supported thereon. A force absorber is coupled between the interconnecting frame and the support arm for dissipating shock forces generated between the support arm and the interconnecting frame as a result of rapid movement in a generally vertical direction of the interconnector.

The carrier has a carrying configuration in which the mounting member is substantially fixed relative to the interconnecting frame and the support arm is capable of limited motion relative to the interconnecting frame, the limited relative motion controlled by the force absorber.

One embodiment of the present invention includes a method for absorbing shock forces generated within a bicycle carrier. The method comprises mounting a bicycle carrier to the rear of a vehicle. A bicycle support arm is oriented into an equipment carrying configuration so that a connection end of the support arm is coupled to an interconnecting frame of the carrier and an equipment carrying end of the support arm is cantilevered away from the frame. A force absorber is coupled between the interconnecting frame and the support arm for dissipating shock forces generated between the support arm and the interconnecting frame as a result of rapid movement of the vehicle in a generally vertical direction.

In an additional embodiment, a biasing means is coupled between the support arm and the interconnecting frame so that the biasing means urges the support arm to an equipment carrying configuration when an applied vertical force at the equipment carrying end of the support arm is the weight of a bicycle supported thereon. Also, the biasing means is resiliently yieldable when forces greater than the weight of the bicycle are vertically applied to the equipment carrying end of the support arm.

In another method of the present invention, a bicycle carrier is mounted to the rear of a vehicle and a bicycle is installed upon the carrier. A force absorber is coupled between the vehicle and the bicycle for dissipating shock forces generated between the vehicle and the bicycle as a result of rapid movement of the vehicle in a generally vertical direction.

In summary, in a broad sense, it is contemplated that the present invention encompasses any sports equipment carrier mountable to a vehicle that has a shock absorber included within the structure of the carrier for dissipating generally vertical loads induced within the carrier by the abrupt upward and/or downward movement of the carrying vehicle.

BRIEF DESCRIPTION OF THE DRAWINGS

FIG. 11 is a side view of a sports equipment carrier with at least a partial cross-section showing a support arm mounted to the interconnecting frame with a buffering elastomeric shock absorber coupled between the support arm and a lower mounting member.

FIG. 12 is an enlarged view of the shock absorbing interconnector of FIG. 11, with an additional shock absorber linearly installed within the lower mounting member.

FIG. 13 is an enlarged view of the shock absorber of FIG. 11.

DETAILED DESCRIPTION OF THE PREFERRED EMBODIMENTS

Figure 1:
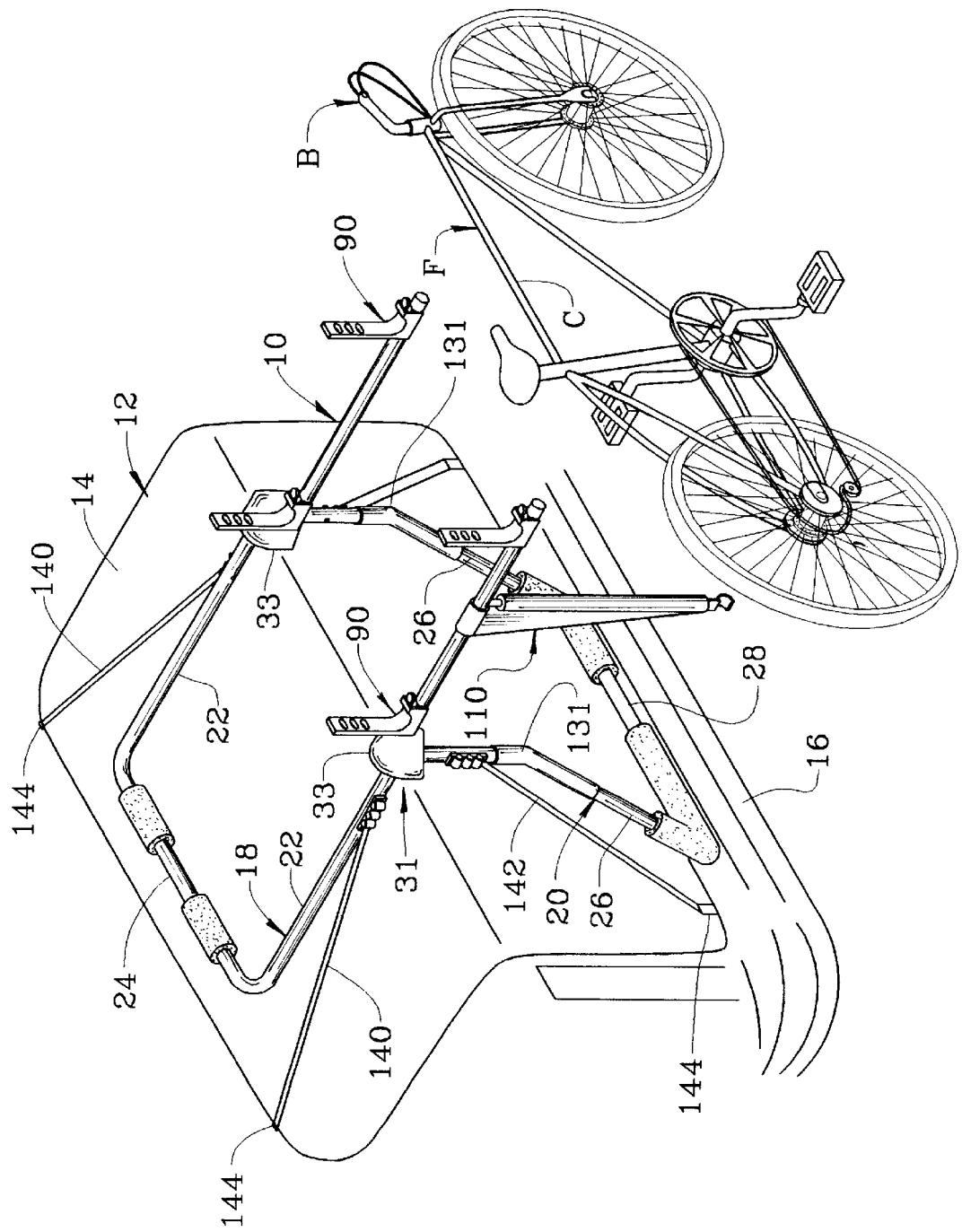
FIG. 1 is a perspective view of the sports equipment carrier in the form of a bicycle carrier mounted upon the rear of a vehicle.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefor, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. This terminology will include these words, specifically mentioned derivatives thereof, and words of similar import.

Figure 2:
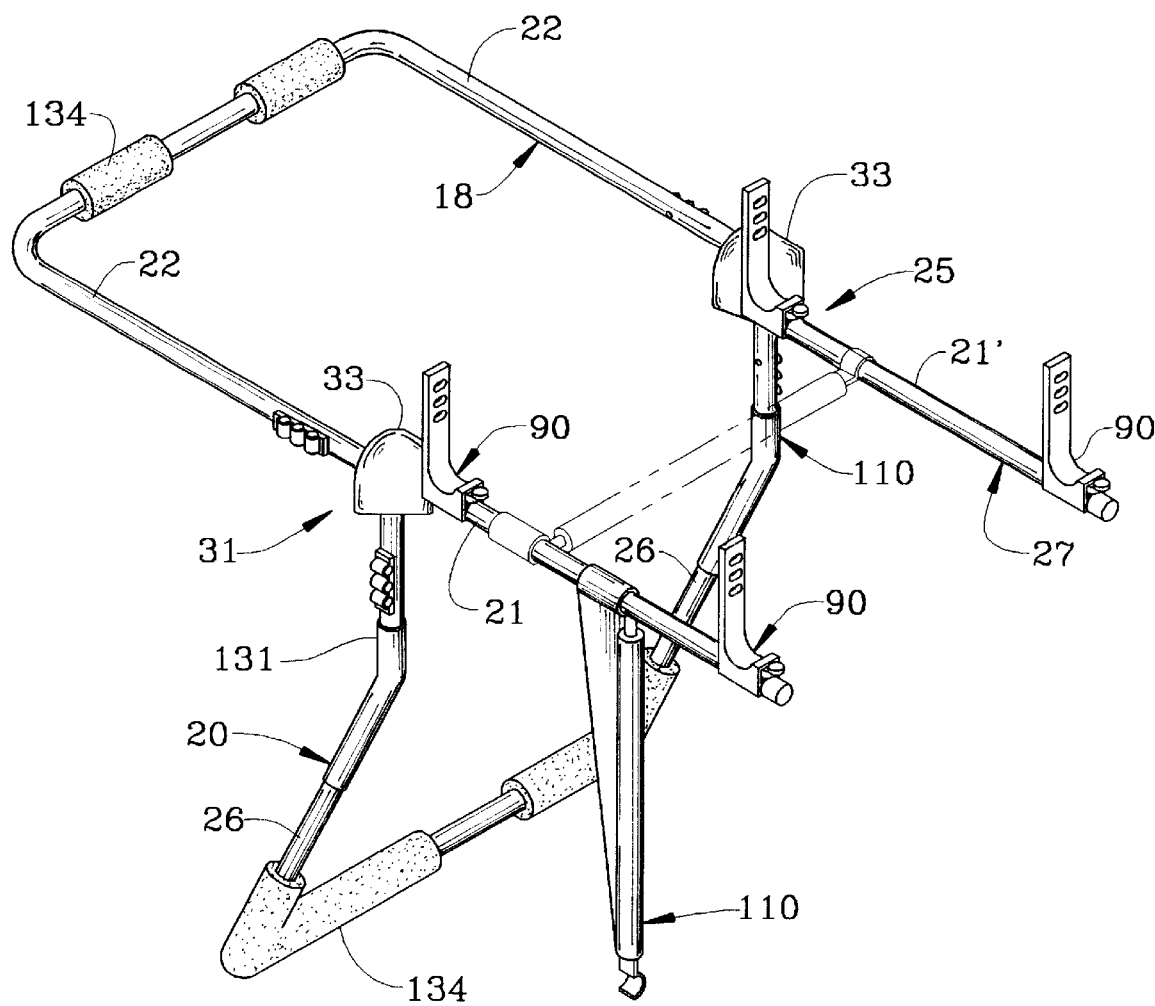
FIG. 2 is a perspective view of the sports equipment carrier showing the housing within which the mounting members and support arms are coupled together.

Referring to the drawings for more detail, FIG. 1 is an illustration of one embodiment of a sports equipment carrier 10 in the form of a bicycle carrier 10. The carrier is installed upon the rear end of a vehicle 12. In the illustrated embodiment, the vehicle is a passenger car having a trunk lid 14 and bumper 16. As may be more clearly seen in FIG. 2, the carrier 10 comprises four primary assemblies: an upper mounting member 18 assembly; a lower mounting member 20 assembly; support arm 21 assembly; and an interconnecting frame 31 assembly that acts as a hub connection for the three previously listed assemblies. The interconnecting frame 31 is at least partially covered by housing 33. The upper mounting member 18 assembly is essentially U-shaped with two leg portions 22 connected together by a bight portion 24. Similarly, the lower mounting member 20 assembly is also essentially U-shaped with two leg portions 26 connected together by a bight portion 28. Each leg 22,26 is connected to the interconnecting frame 31 by a mounting member connection 19. Each support arm 21 is connected to the interconnecting frame 31 by a support arm connection 23. Each, arm 21 has a connection end 25 and an equipment carrying end 27. The arm 21 is connected to the frame 31 at the connection end 25 while the equipment carrying end 27 extends away from the hub. In use, the carrier 10 is configured for a particular vehicle 12, mounted thereupon, and secured thereto by upper and lower securing straps 140, 142. Hooks 144 are provided upon the securing straps 140, 142 to engage a lip about the trunk lid 14 of the vehicle 12. Buckles may be provided within a length of the straps 140, 142 for removing slack and tightening the same. Because the mounting members 18,20 are required to remain substantially rigid during operation, they are typically constructed from metal. To prevent potentially damaging metal-to-metal contact between the carrier 10 and the vehicle 12 to which it is mounted and bicycles (B) carried thereon, soft cushion pads 131, 134 are provided. Anti-sway bar 110 is provided to restrain horizontal sway of the support arm 21 assembly. In the illustration of FIG. 1, the sports equipment to be carried upon the carrier 10 is the bicycle (B) having a frame (F) and bicycle bar (C). The bar (C) is securably held within cradles 90 connected upon the support arms 21.

The present invention incorporates a force or shock absorber 11 into the structure of the carrier 10 to dissipate shock forces induced in the carrier 10 by abrupt upward and downward motion of the carrying vehicle 12. Because the primary assemblies of the carrier 10 may be coupled together upon the interconnecting frame 31, the inclusion of a shock absorber 11 at the frame 31 has been found to advantageously create a shock absorbing interconnector 30. As previously discussed, the shock absorber 11 may be included at any location within the structure of the carrier 10 that lends itself to incorporation of the same. The illustrated embodiments of FIGS. 3 through 9, however, show various configurations in which the shock absorber 11 is incorporated into the interconnecting frame 31 to form the shock absorbing interconnector 30.

Figure 3:
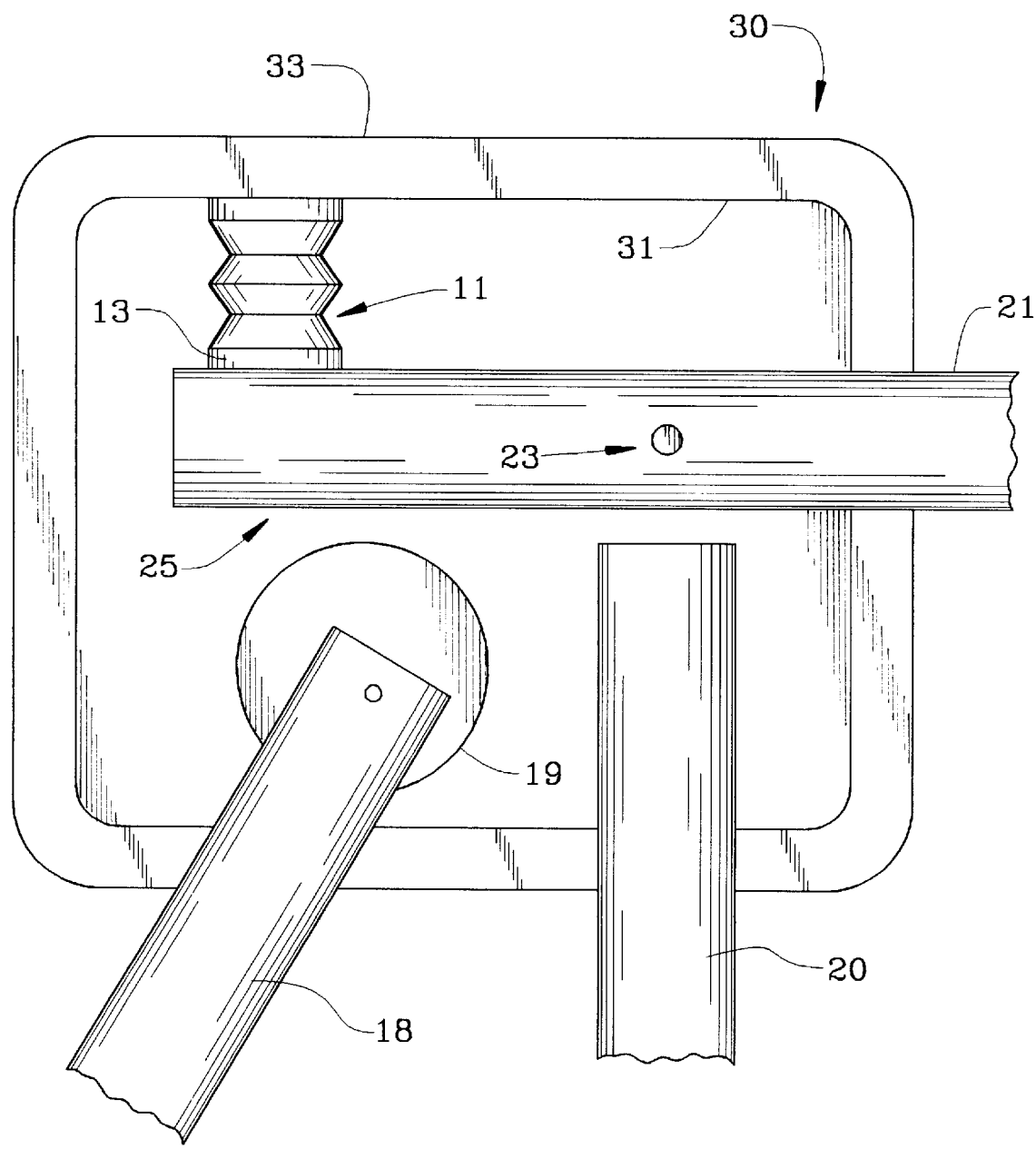
FIG. 3 is a schematic view of a support arm pivotally connected to the interconnecting frame and buffered by an elastomeric shock absorber.

FIG. 3 shows the lower mounting member 20 connected to the frame 31 in fixed relation thereto. The upper mounting member 18 is pivotally connected to the frame 31, but capable of locked orientation therewith. The support arm 21 is pivotally connected to the frame 31 at a pivot pin for limited relative movement therewith. A shock absorber 11 in the form of an elastomeric spring 13 is located between the arm 21 and the frame 31. When a weight force of a carried bicycle (B) is applied at the equipment carrying end 27 of the arm 21, the connection end 25 of the arm 21 moves upwardly and causes the shock absorber 11 to press against the frame 31. In this way, the arm 21 is maintained in a bicycle carrying configuration. The illustrated shock absorber 11 is of an accordion shape. This configuration facilitates uniform compression of the elastomeric spring 13. As described above, the stiffness and size of the spring 13 is chosen so that under normal operating conditions, with no appreciable vertical forces being induced by the carrying vehicle 12, the support arm 21 will be maintained in the carrying configuration. When the carrying vehicle 12 encounters a rise in the roadway that causes the vehicle 12 to move upwardly in an abrupt manner, that movement is transferred directly to the frame 31 by the fixed connection of the lower mounting member 20. The upward movement of the frame 31 is directly communicated to the support arm 21 at the support arm connection 23 that is pinned to the frame 31. As the vehicle 12 and carrier 10 have been traveling along even road, the carried bicycle (B) has remained relatively fixed with respect to vertical and has been exerting a downward force on the support arm 21 generally equal to the weight of the bicycle (B). As a result, the bicycle's (B) tendency and inertia is to remain at that same vertical position when the frame 31 abruptly moves upward with the carrying vehicle 12. The load caused by the bicycle (B) on the support arm 21 is substantial for two reasons; the acceleration forces are great because of the abruptness or quickness of the frame's 31 movement, and the support arm 21 acts as a fulcrum because of its cantilevered configuration resulting in the force caused by the bicycle's (B) initial resistance to the upward movement being amplified by the distance at which it is applied from the point of connection between the arm 21 and the frame 31. As the frame 31 moves upward, the net affect of the bicycle's (B) mass on the support arm 21 is to press downward the cradle 90 within which said bicycle (B) is carried. The connection end 25 of the arm 21 located opposite the pivot pin from the bicycle (B) moves upwardly into pressing engagement with the elastomeric spring 13 that acts as a shock absorber 11. As the arm 21 presses with greater force upon the spring 13, the spring 13 resists with greater force. At some point the two opposing forces will equalize and the spring will re-expand under it own elastic forces thereby re-orienting the support arm 21 into the carrying configuration. In this manner, the initial jolt of the abrupt upward movement is absorbed in the shock absorber 11 by allowing buffering movement of the support arm through a limited range of motion. The shock absorber 11 then dissipates the imparted force and energy then stored in the absorber 11 in a controlled manner as it moves the support arm 21 back to the carrying configuration. The same buffering action will be achieved by use of the spring 13 when the vehicle moves abruptly downward. In this case, the spring 13 must be attached to the frame 31, but the spring will react similarly in tension as it did in compression assuming that the compression and tension characteristics of the spring are similar.

Figure 4:
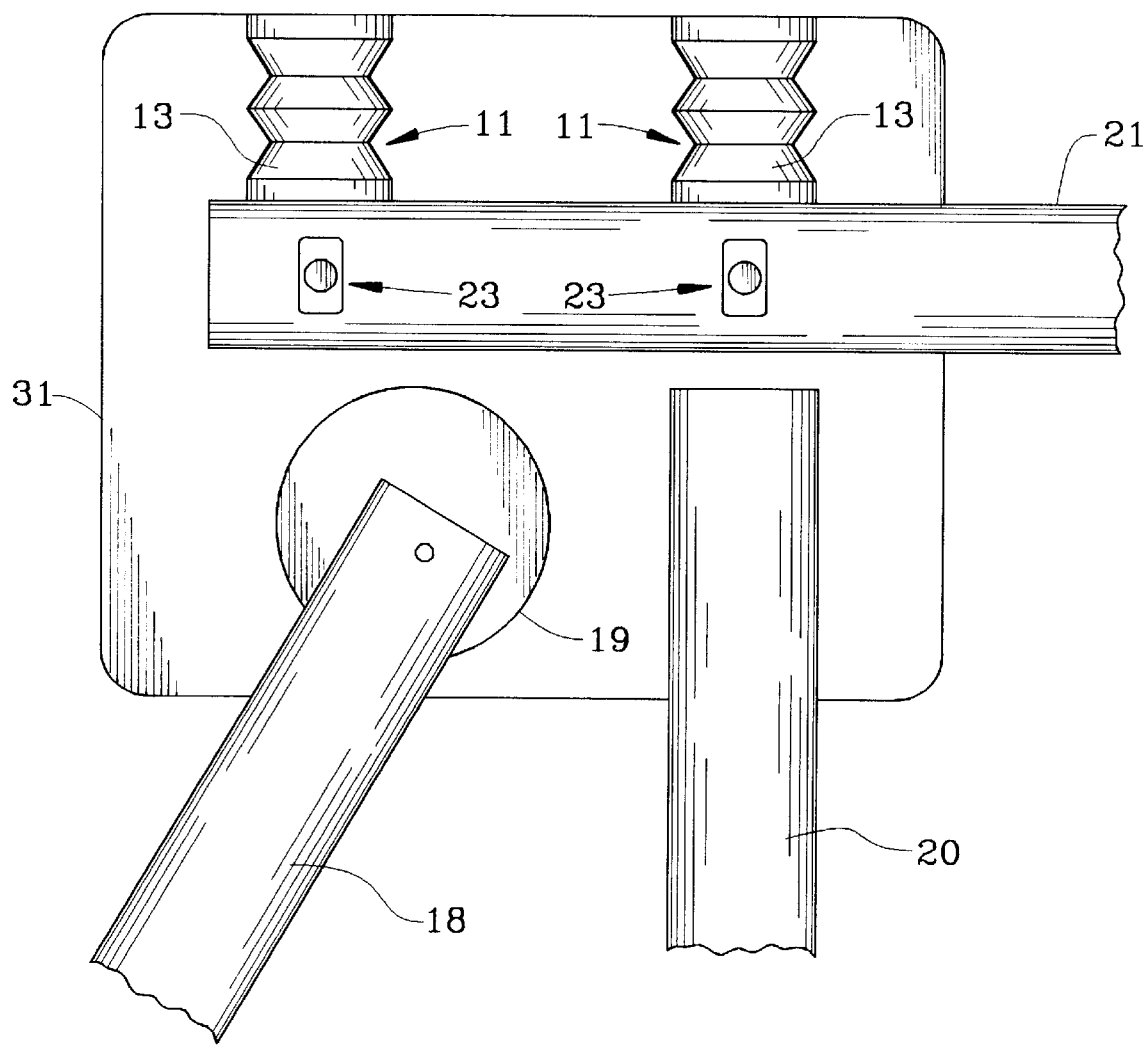
FIG. 4 is a schematic view of a support arm connected to the interconnecting frame for limited vertical movement relative thereto and buffered by a pair of elastomeric shock absorbers.

FIG. 4 illustrates a support arm 21 that is connected to the frame 31 for limited vertical movement therebetween. The limited range of vertical movement is limited by the pin and slot configuration illustrated. The elastomeric springs 13 perform similarly to that described with respect to FIG. 3. While a pair of springs 13 have been illustrated, it should be appreciated that one spring 13 could operate appropriately, if properly selected. As an alternative, elastomeric inserts could be placed within the clearance space between the pins and slots to provide an appropriate shock absorber 11 between the frame 31 and the support arm 21.

Figure 5:
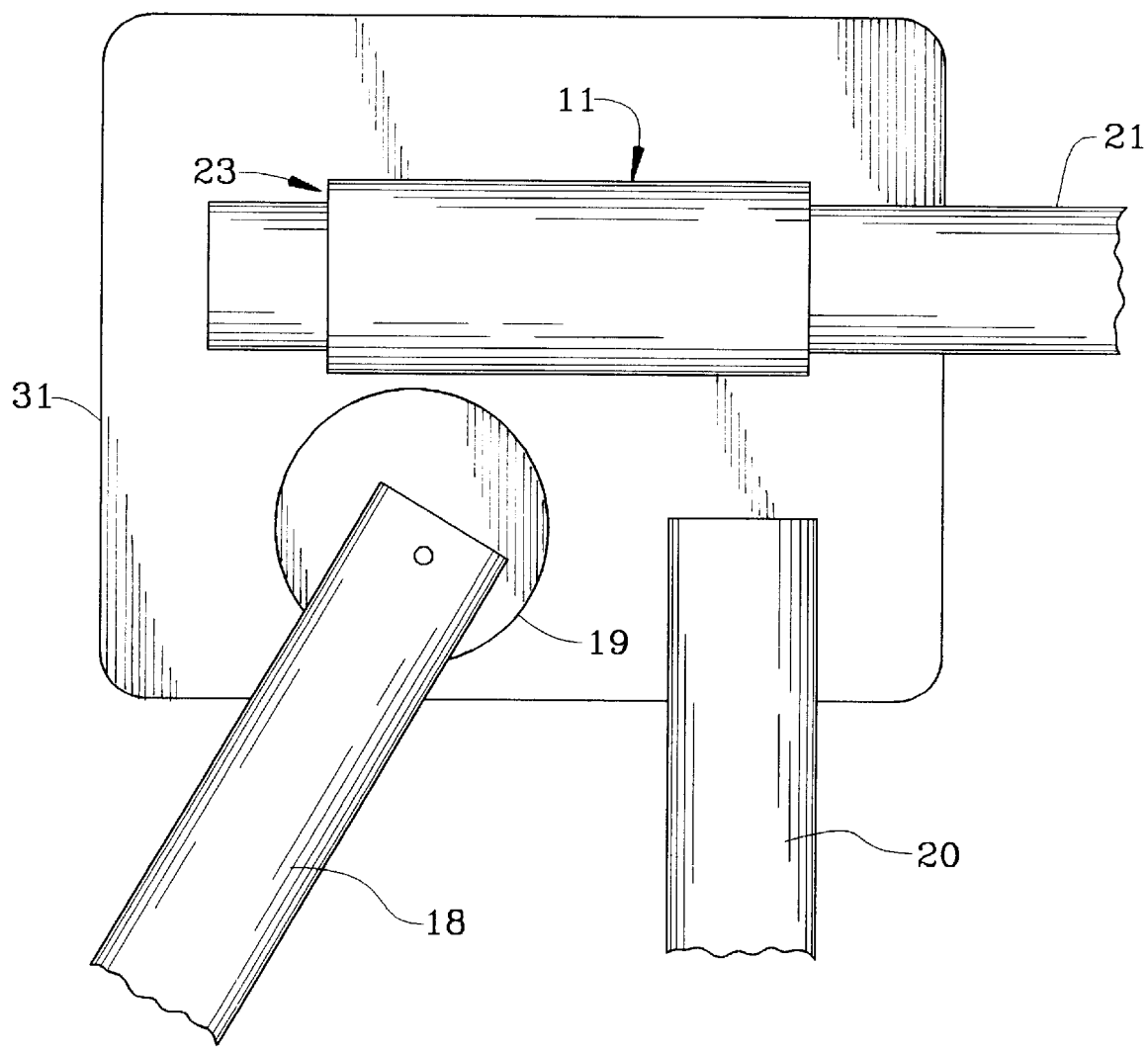
FIG. 5 is a schematic view of a support arm connected to the interconnecting frame by a shock absorbing sleeve.

FIG. 5 illustrates an elastomeric sleeve or bushing within which the support arm 21 may be retained. The sleeve is fixedly connected to the frame and the arm 21 may be frictionally retained therein. When vertical forces are applied to the support arm 21, they are resisted at two locations. For instance, if a downward force is applied to the distal end of the arm 21 away from the frame 31, that force will be countered at a top side of the sleeve at the left end of the sleeve and at a bottom side of the sleeve at a right end.

Figure 6:
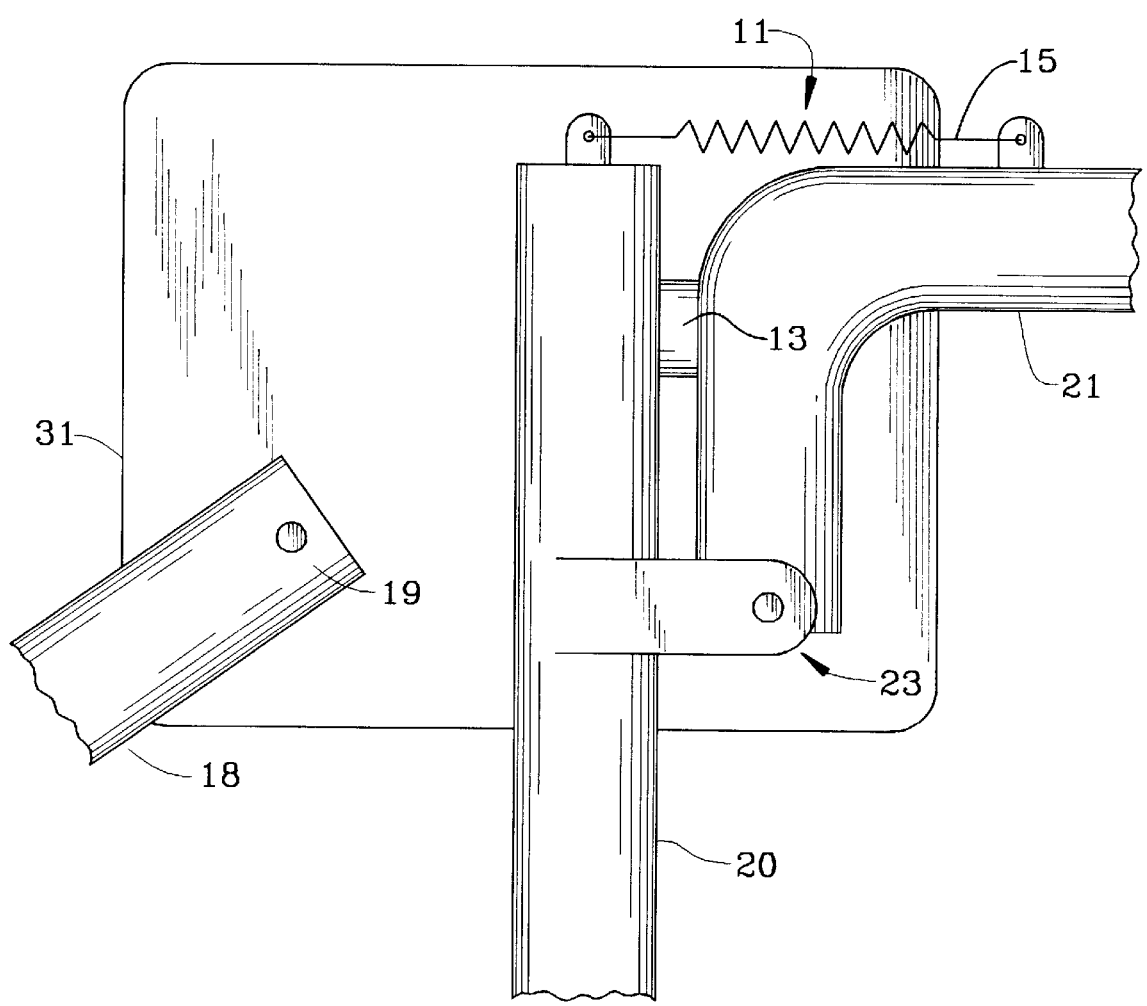
FIG. 6 is a schematic view of a support arm pivotally connected to the interconnecting frame and buffered by an elastomeric shock absorber and a coil spring shock absorber.
Figure 7:
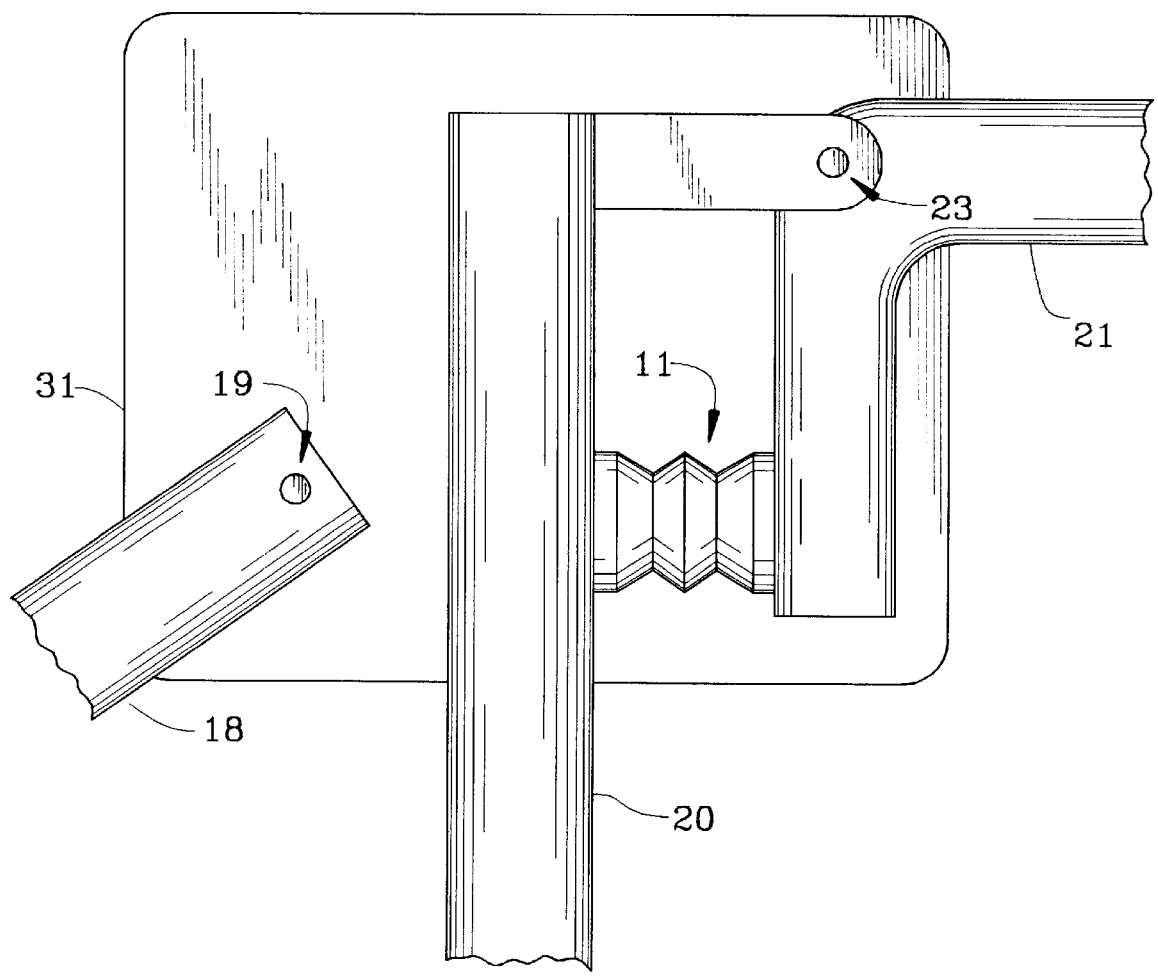
FIG. 7 is a schematic view of a support arm pivotally connected to one of the mounting members and buffered by an elastomeric shock absorber therebetween.

FIG. 6 illustrates an embodiment in which the support arm 21 is journaled to the lower mounting member 20. An elastomeric spring 13 is provided to control upward forces exerted upon the distal equipment carrying end of the arm 21 resulting from abrupt downward motion of the frame 31. A coil spring 15 is connected between the mounting member 20 and the support arm 21 for resisting downward forces resulting from abrupt upward motion of the frame 31. Each of the shock absorbers 11 in the illustrated configuration could have been interstitially placed between the arm 21 and the frame 31 instead of the mounting arm 20 to achieve similar effects. FIG. 7 is similarly configured with an elastomeric spring positioned between the support arm 21 and the mounting member 20 to which the arm 21 is journaled.

Figure 8:
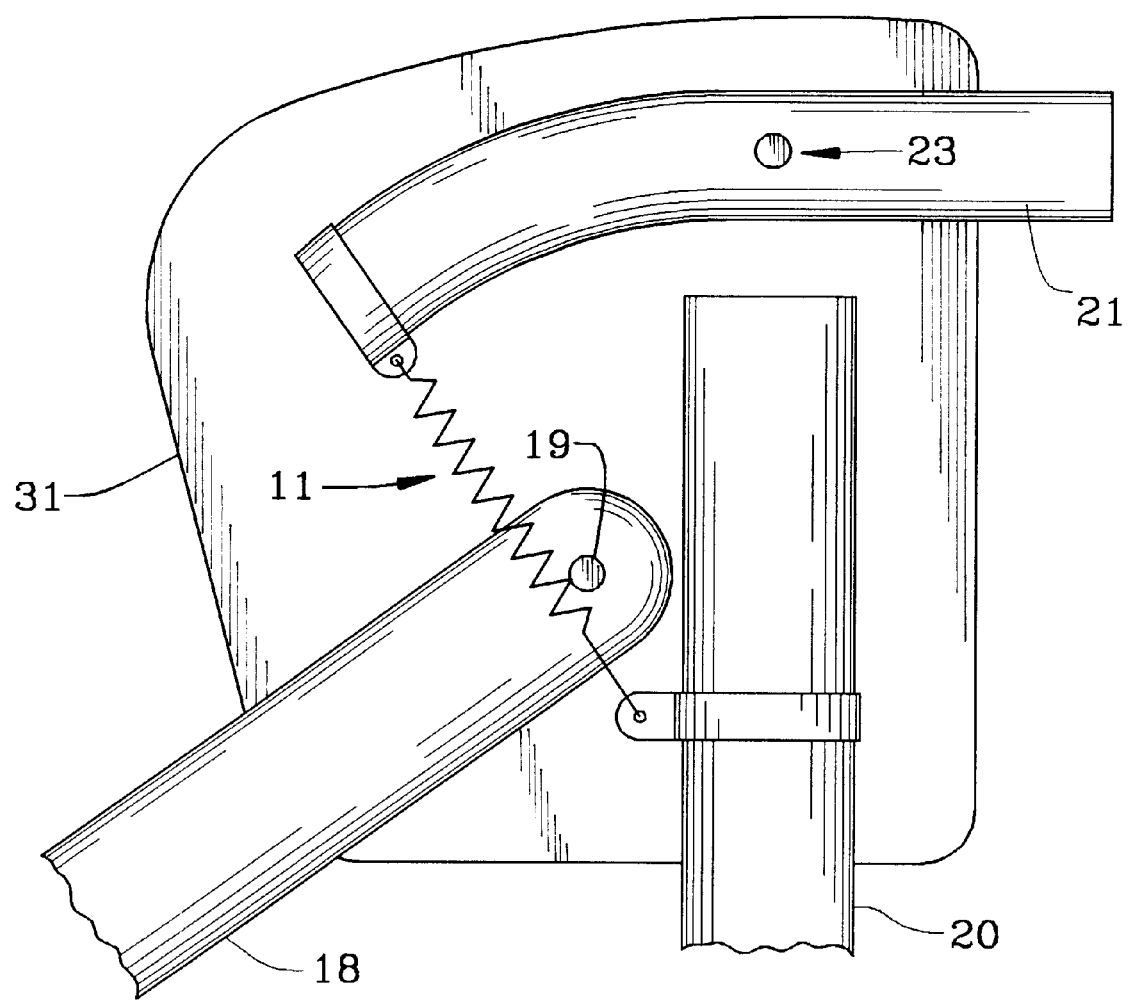
FIG. 8 is a schematic view of a support arm pivotally connected to the interconnecting frame and buffered by a coil spring shock absorber.

FIG. 8 incorporates a coil spring connected between the support arm 21 and the mounting member 20.

Figure 9:
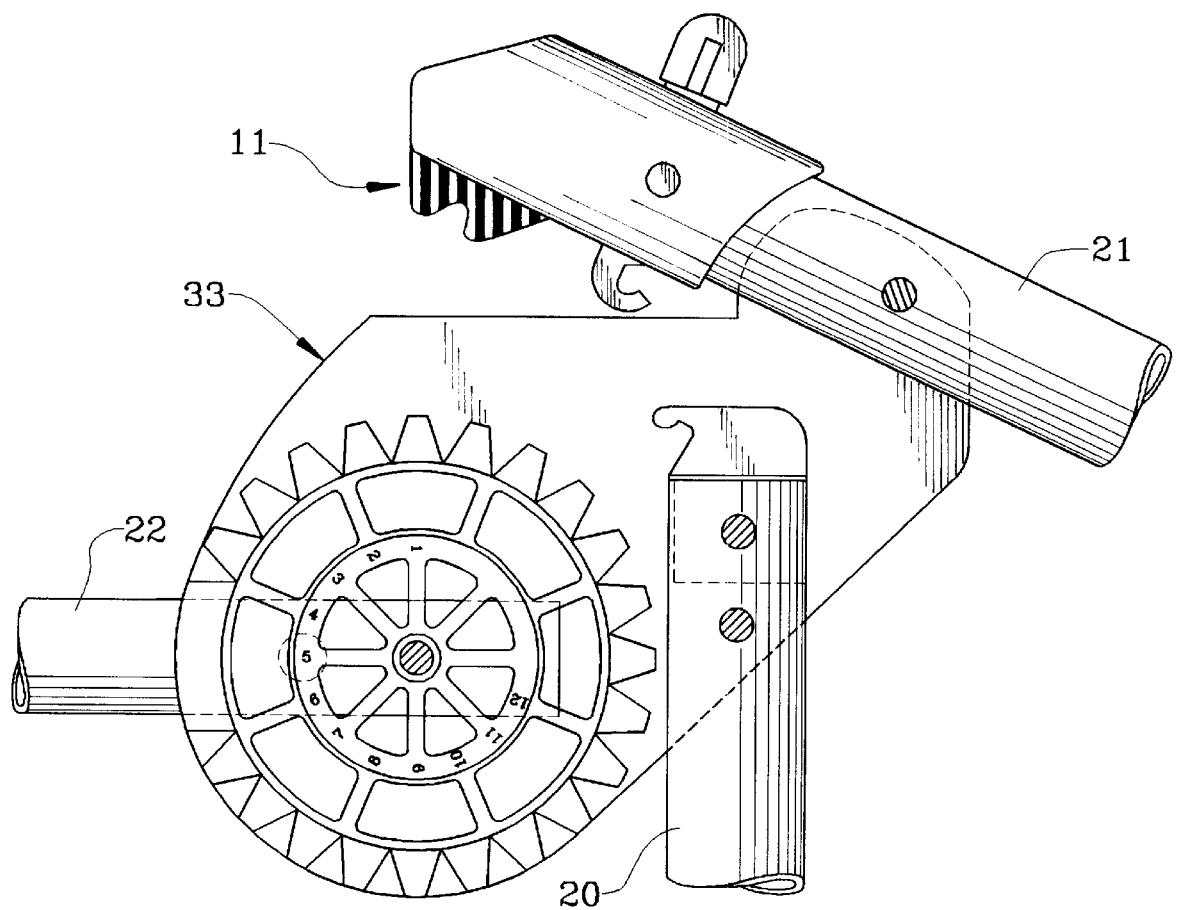
FIG. 9 is a schematic view of a support arm pivotally connected to the interconnecting frame and buffered by an elastomeric shock absorber.

FIG. 9 illustrates the fact that many existing bicycle carriers can be retro-fitted or modified to include a shock absorber 11 between abutting elements that allows relative movement between the abutting elements and controlled dissipation of shock forces experienced therein. As shown, a compressible elastomeric shock absorber 11 is interstitially placed between two rigid components that would have previously communicated motion and forces directly thereacross.

Figure 10:
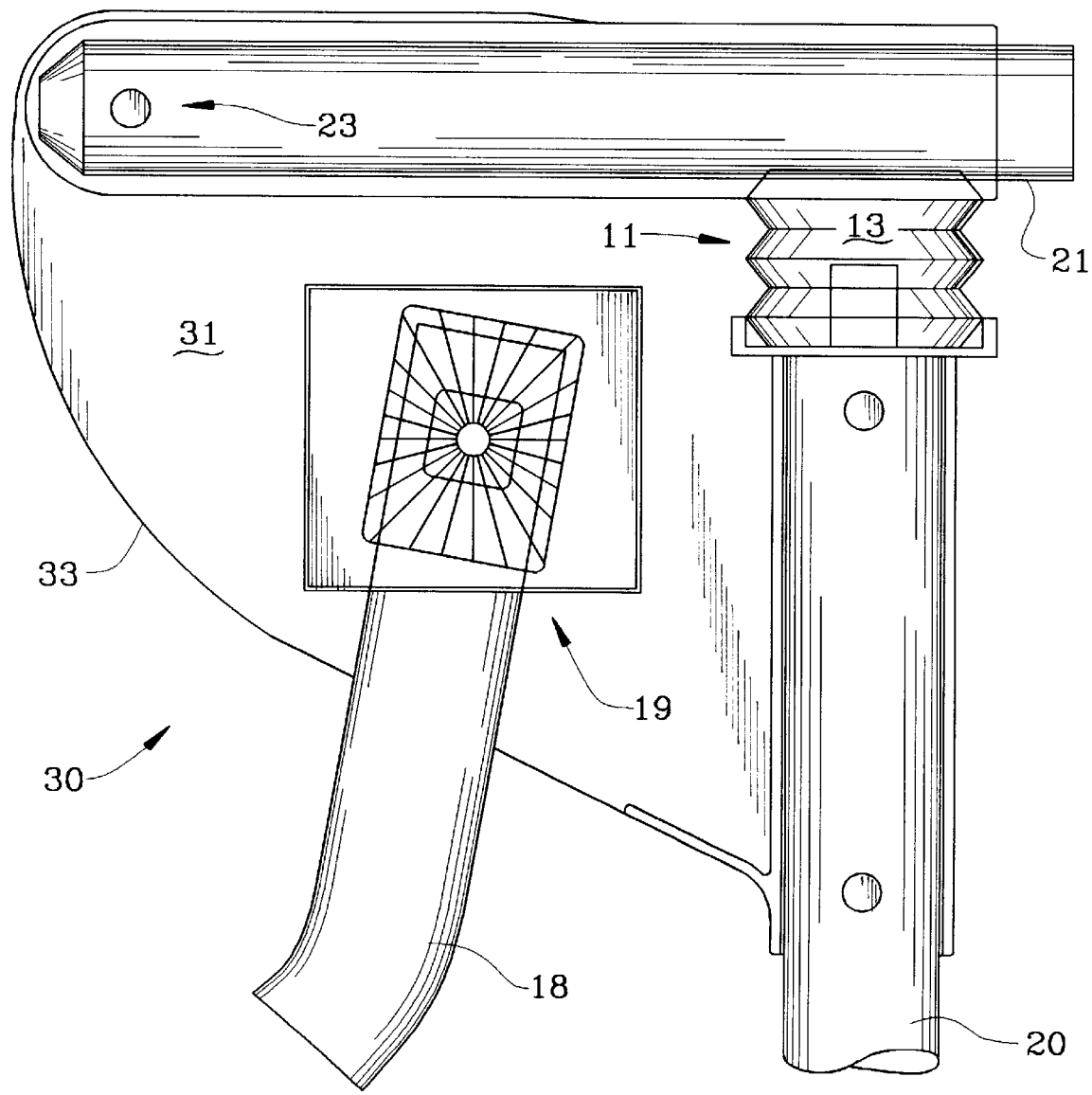
FIG. 10 is a schematic view of a support arm pivotally connected to the interconnecting frame and buffered by an elastomeric shock absorber.

FIG. 10 illustrates an embodiment of the equipment carrier 10 in which a support arm 21 is pivotally connected to the frame 31. A shock absorber 11 is provided by an elastomeric spring 13 located between the arm 21 and a top end of the mounting member 20. The upper mounting member 18 is pivotally connected to the frame 11 with a splined disc located therebetween for indicating specific orientations of the mounting member 18 that correlate to proper configurations for different vehicles 12. The housing 33 is shown about the shock absorbing interconnector 30.

FIG. 11 shows an embodiment of the present invention in which the structure of U.S. Pat. No. 5,363,996 is modified to include a shock absorber 11 coupled between the support arm 21 and the mounting member 20 that performs similarly to the absorbers 11 of the similar embodiments described herein. The provision of shock absorber 11 within the interconnector 30 does not rigidly engage the two toothed components, but instead play or "slop" is maintained at the toothed engagement so that the two components are free to move relative one to the other within a limited range. The limited range, however, does not permit total disengagement of the toothed components, one from the other. The shock absorber 11 as illustrated in FIG. 13 includes a yieldable body 17 with a stud 29 imbedded therein. The body 17 is constructed from plastic that in one embodiment is 80 durometer urethane. The stud 29 is constructed from stainless steel in one embodiment. FIG. 12 illustrates the details of the shock absorbing interconnector 30 of FIG. 11. Additionally, a second shock absorber 11' is included within the lower mounting member 20. It is contemplated that either one or both of the absorbers 11 and 11' may be included in a particular carrier 10.

Figure 14:
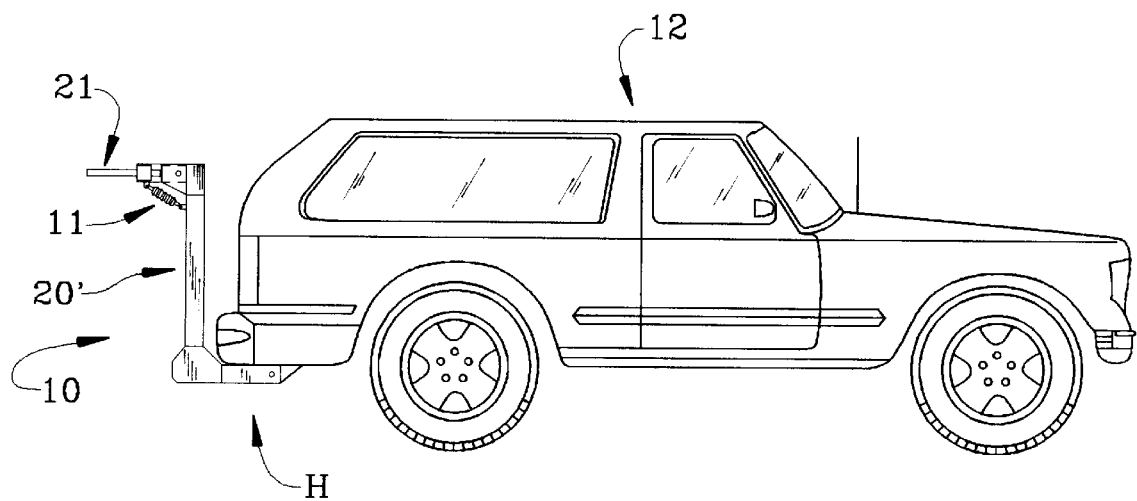
FIG. 14 is a side view of a hitch mounted shock absorbing carrier installed upon a transporting vehicle.

FIG. 14 illustrates another embodiment of the present invention in which a sports equipment carrier 10 is mounted to a transporting vehicle 12 at a hitch assembly (H). It is contemplated that the hitch assembly (H) of the vehicle 12 may be of any configuration. Conventional configurations of the hitch assembly (H) include a tube into which a hitch insert member 150 of the carrier 10 may be installed and fixed therein. Alternatively, the vehicle's 12 hitch assembly (H) may terminate in a "ball" upon which the carrier 10 may be fastened.

Figure 16:
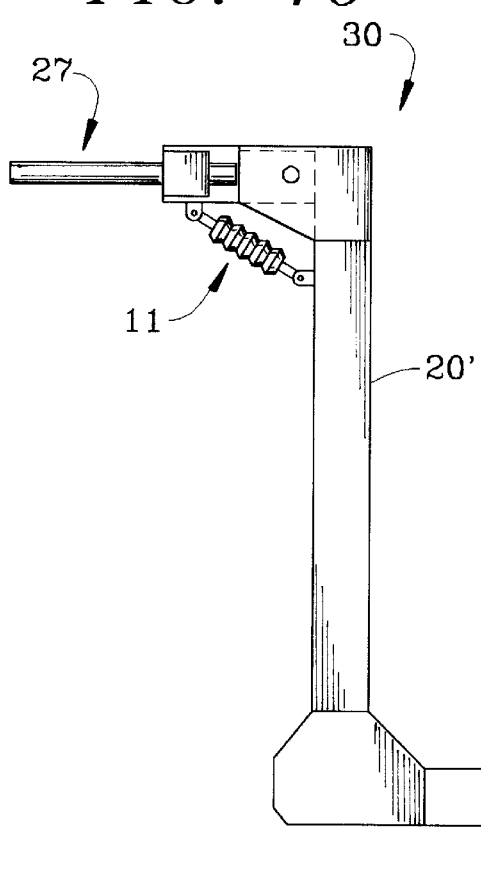
FIG. 16 is a side view of a hitch mounted shock absorbing carrier.
Figure 15:
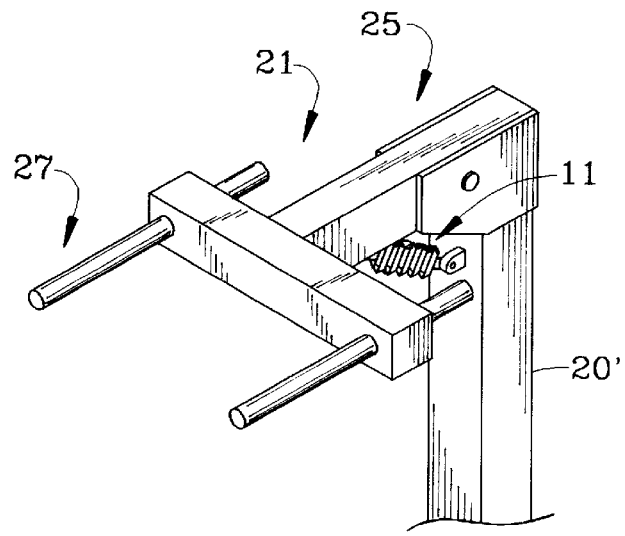
FIG. 15 is a perspective view of a top portion of a hitch mounted shock absorbing carrier.

As may be more clearly seen in FIGS. 15 and 16, the hitch mounted carrier 10 may have only a single mounting member 20' that is generally upright in orientation. Similar to the embodiments of the present invention described hereinabove, a shock absorber 11 is incorporated into the structure of the carrier between the equipment carrying end 27 of the support arm(s) 21 and the vehicle 12. The shock absorber 11 minimizes and dampens the communication of shock loads induced by vertical motion of the vehicle 12 through the carrier 10 and to the sports equipment (B) being carried. As an illustrative embodiment, FIG. 16 shows a shock absorbing interconnector 30 between the upright mounting member 20' and the support arm(s) 21. The interconnector 30 provides a degree of play therein so as to allow a limited range of relative movement between the mounting member 20' and the support arm(s) 21. As an alternative embodiment, the shock absorber 11 may be incorporated into the mounting member 20' as a linear component thereof. As in the other described embodiments of the present invention, the shock absorber 11 controls and limits the relative motion between those members and dissipates shock loads induced into the carrier 10 by generally vertical movements of the vehicle 12.

The present invention is also applicable to load carriers which are located on a roof of a vehicle and includes support arms that can be pivoted from the roof to extend outwardly from the vehicle. Such a carrier is described, for example in PCT publication No. 93/09975. Also the invention may be utilized on carriers having support arms that are secured to the vehicle by any other method, such as through the license plate mountings. (See, for example, PCT publication No. 93/18941).

In general, the present invention is useful with any load carrier having cantilevered arms for supporting the load.

It is to be understood that while certain forms of the present invention have been illustrated and described herein, the claimed invention is not to be limited to the specific forms or arrangement of parts described and shown.

What is claimed and desired to be secured by Letters Patent is as follows:

1. A carrier for sports equipment comprising:
  a pair of mutually rotatable mounting members, each of said mounting members configured for engagement with a vehicle;
  at least one support arm for holding an article of sports equipment;
  said at least one support arm being movable at least vertically relative to at least one of said mounting members, said at least one support arm being arranged in an equipment transporting configuration; and
  a yieldable force absorber operably coupled between said support arm and at least one of said mounting members to assist in retaining the support arm in said equipment transporting configuration and to dissipate shock loads generated within said carrier as a result of rapid upward movement of the vehicle in a generally vertical direction thereby reducing communication of said shock loads to said support arm during travel.

2. A shock absorbing bicycle carrier for use with a vehicle, said carrier comprising:
  a mounting member for engaging said carrier to a vehicle;
  a bicycle support arm coupled to said mounting member for holding a bicycle thereupon in a bicycle transporting configuration; and
  a yieldable shock absorber operably coupled to said carrier between said support arm and said mounting member for dissipating shock loads generated within said carrier as a result of rapid upward movement of the vehicle in a generally vertical direction thereby reducing communication of said shock loads to said support arm during travel.

3. A shock absorbing interconnector for a sports equipment carrier for use with a vehicle, said interconnector comprising:
  an interconnecting frame;
  a mounting member coupled to said interconnecting frame and adapted for mounting engagement upon a vehicle;

a support arm coupled to said interconnecting frame in an equipment transporting configuration, said support arm adapted to receive a piece of sports equipment to be transported upon the vehicle;

a yieldable force absorber coupled between said mounting member and said support arm for dissipating shock loads generated between said support arm and said mounting member as a result of rapid upward movement in a generally vertical direction of said interconnector;

said support arm further comprises a connection end, said connection end being opposite an equipment carrying end of said support arm; and said force absorber is adapted to urge said support arm to said equipment transporting configuration when a vertical load upon said support arm is a weight force of a piece of sports equipment supported thereon, and said force absorber being resiliently yieldable when vertical loads greater than the weight of the piece of sports equipment are experienced upon said support arm.

4. The shock absorbing interconnector for a sports equipment carrier as recited in claim 3, wherein said force absorber comprises a resilient rubber spring.

5. The shock absorbing interconnector for a sports equipment carrier as recited in claim 3, wherein said force absorber comprises a coil spring.

6. The shock absorbing interconnector for a sports equipment carrier as recited in claim 5, wherein said force absorber further comprises a resilient rubber spring.

7. A shock absorbing bicycle carrier adapted to be mounted to the rear of a vehicle, said carrier comprising:

an interconnecting frame;

at least one mounting member coupled to said interconnecting frame and adapted to mount said bicycle carrier to a rear portion of a vehicle;

a support arm pivotally coupled to said interconnecting frame and arranged in an equipment transporting configuration for supporting a piece of sports equipment thereupon for transport upon the vehicle;

a yieldable force absorber coupled between said mounting member and said support arm for dissipating shock forces generated between said support arm and said mounting member as a result of rapid upward movement in a generally vertical direction of said interconnecting frame;

said mounting member being substantially fixed relative to said interconnecting frame and said support arm is capable of limited motion relative to said interconnecting frame in said equipment transporting configuration, said limited relative motion controlled by said force absorber.

8. The shock absorbing bicycle carrier adapted to be mounted to the rear of a vehicle as recited in claim 7, wherein said force absorber is adapted to urge said support arm to said equipment transporting configuration when a vertical load upon said support arm is a weight force of a piece of sports equipment supported thereon, and said force absorber being resiliently yieldable when vertical loads greater than the weight of the piece of sports equipment are experienced upon said support arm.

9. The shock absorbing bicycle carrier adapted to be mounted to the rear of a vehicle as recited in claim 7, wherein said force absorber comprises a resilient rubber spring.

10. The shock absorbing bicycle carrier adapted to be mounted to the rear of a vehicle as recited in claim 7, wherein said force absorber comprises a coil spring.

11. The shock absorbing bicycle carrier adapted to be mounted to the rear of a vehicle as recited in claim 10, wherein said force absorber further comprises a resilient rubber spring.

12. A method for absorbing shock forces generated within a bicycle carrier, said method comprising the following steps:

mounting a bicycle carrier to the rear of a vehicle;

orienting a bicycle support arm into an equipment transporting configuration so that a connection end of said support arm is coupled to an interconnecting frame of said carrier and an equipment carrying end of said support arm is cantilevered away from said frame; and dissipating shock forces generated between said support arm and said interconnecting frame as a result of rapid upward movement of the vehicle in a generally vertical direction utilizing a yieldable force absorber coupled between said interconnecting frame and said support arm.

* * * * *